United States Patent [19]

Sassi

[11] Patent Number: 5,585,000
[45] Date of Patent: Dec. 17, 1996

[54] CYCLONE SEPARATOR

[75] Inventor: Carlo Sassi, Parma, Italy

[73] Assignee: Metro International S.r.l., Parma, Italy

[21] Appl. No.: 445,136

[22] Filed: May 19, 1995

[30] Foreign Application Priority Data

Jul. 14, 1994 [IT] Italy ................................. PR940011 U

[51] Int. Cl.⁶ ..................................................... B01D 21/26
[52] U.S. Cl. ........................ 210/512.1; 55/459.1; 96/209
[58] Field of Search ................................ 55/459.1, 459.2,
55/459.3, 459.4, 459.5, 342; 96/208, 209;
209/715, 719, 720, 721, 728, 733; 210/512.1,
512.2, 787, 788, 175

[56] References Cited

U.S. PATENT DOCUMENTS

| | | | |
|---|---|---|---|
| 2,816,490 | 12/1957 | Brodway et al. | 209/733 |
| 3,501,001 | 3/1970 | Moller et al. | 210/512.1 |
| 5,071,542 | 12/1991 | Tuszko et al. | 209/720 |
| 5,116,488 | 5/1992 | Torregrossa | 210/512.1 |
| 5,269,949 | 12/1993 | Tuszko et al. | 210/512.1 |

*Primary Examiner*—David A. Reifsnyder
*Attorney, Agent, or Firm*—Darby & Darby, P.C.

[57] ABSTRACT

A cyclone separator of the type utilized in the food processing industry for separating water vapor from a liquid foodstuff, typically tomato juice, comprises a vertical chamber into which the mixture of foodstuff and vapor is introduced tangentially. The vapor is gathered into the top end of a duct accommodated by the chamber, at least in part, and discharged from the opposite end of the duct into the chamber of a successive separator or into a condenser. The side wall of the chamber is tapered, widening marginally from top to bottom, so as to favor the separation of the liquid phase and its expulsion through a bottom outlet.

5 Claims, 2 Drawing Sheets

5,585,000

CYCLONE SEPARATOR

BACKGROUND of the INVENTION

The present invention relates to a cyclone type separator.

Such an item of apparatus is employed to advantage specifically, though not exclusively, in the food industry, the typical function being to separate a concentrate such as tomato juice, for example, from the water vapor it contains.

Familiar multistage evaporation systems appear as a plurality of cyclone separators connected one with another in cascade.

Each stage is composed of at least one tube nest heat exchangers and a separator exhibiting a main body that comprises a cylindrical central section, a top section of toroidospherical geometry with a vapor outlet pipe, and a conical bottom section of which the vertex affords an opening with an outlet pipe for the liquid phase.

The product to be treated is introduced into the separator via the bottom part of the cylindrical section, entering tangentially in most instances. It is usual to create and maintain a vacuum (or in any event a pressure below atmospheric) internally of the separator, so as to obtain a high specific volume and high velocity of the ascending vapors. An effective separation is obtained by selecting a diameter for the separator large enough to occasion a reduction in velocity such that the droplets of liquid fall by gravity, thereby ensuring that the mass of the droplets is greater than the entraining force of the vapor.

The separation is assisted further by centrifugal force, where the product enters tangentially, as the droplets will be flattened against the wall. The vapor carried away through the top outlet pipe is directed into a further stage and utilized as a source of heat for the relative exchanger.

The liquid phase of the product emerging from the bottom pipe is either discharged or recirculated in the heat exchanger.

Cyclone separators found in multistage evaporation systems of conventional type are rendered somewhat complex in constructional terms by the layout of the connecting pipelines.

The complexity is attributable to various factors, one of which being the presence of the duct through which vapors are conveyed from one separator to the next. In effect, the duct in question exhibits at least three changes of direction.

Given the large diameter of the pipelines and the fact that the material used in manufacture is often stainless steel, considerable costs are incurred.

The object of the present invention is to overcome the drawback mentioned above by providing a cyclone separator that features simplicity and economy in construction, and relatively compact dimensions not least in terms of height.

Among the advantages of the invention is that it allows of obtaining a more efficient separation of vapor from a foodstuff, in each single stage, than can be achieved with conventional separators.

SUMMARY OF THE INVENTION

The stated object is realized, together with other objects and advantages, through the adoption of a cyclone separator that comprises a vertical chamber with a tangential inlet and a bottom outlet, also a duct, accommodated internally of the chamber at least in part and anchored to the relative wall, of which one end located uppermost affords an inlet port positioned to receive separated vapors, and the remaining outlet end connects with the inlet of a successive separator or of a condenser.

BRIEF DESCRIPTION OF THE DRAWINGS

The invention will now be described in detail, by way of example, with the aid of the accompanying drawings, in which.

DESCRIPTION OF THE PREFERRED EMBODIMENTS

A multistage cyclone evaporation system embodied in accordance with the present invention will comprise a plurality of separators connected in series.

Figure 1:
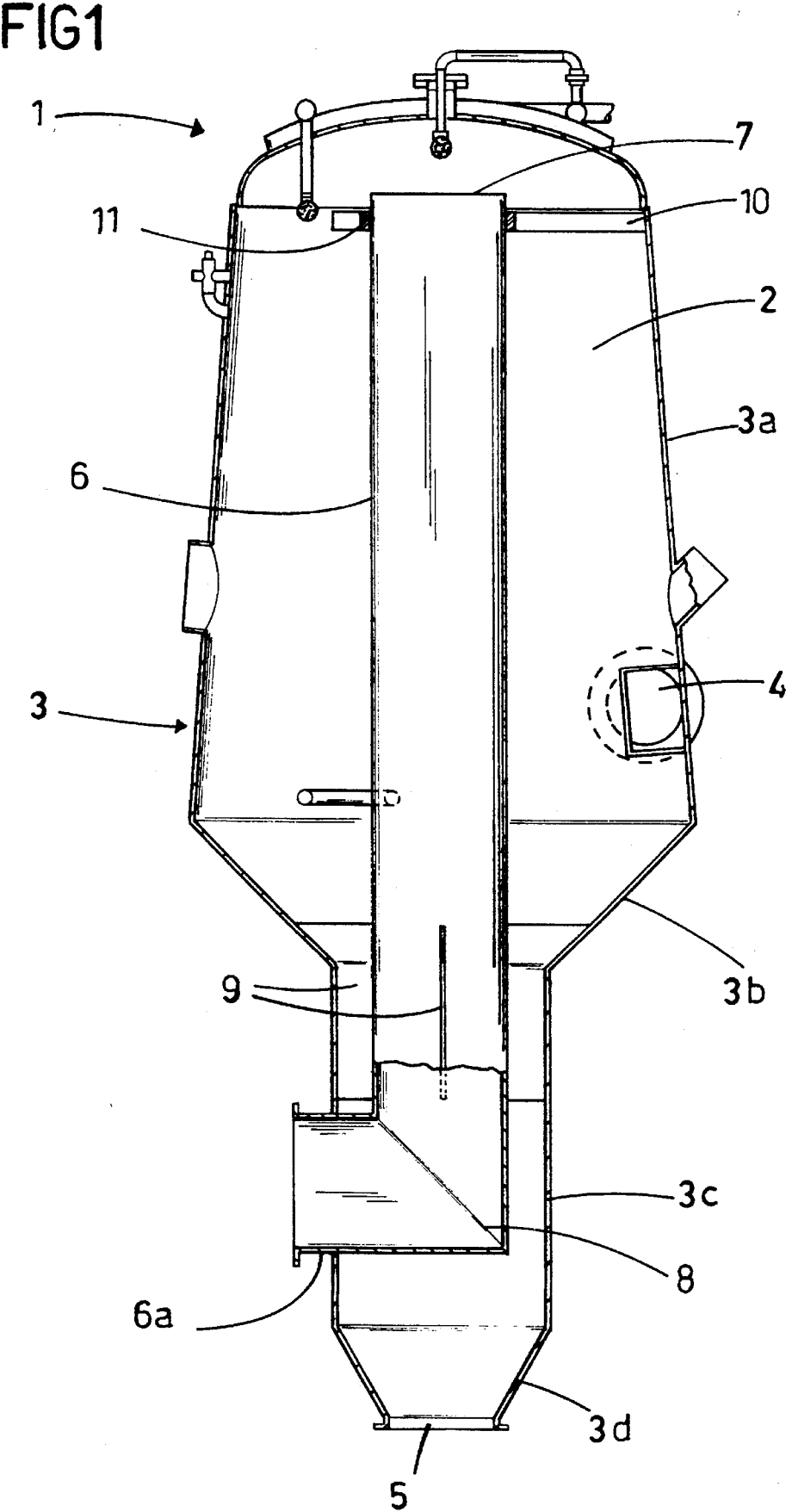
FIG. 1 illustrates a cyclone separator, seen partly in section on a median vertical plane.
Figure 2:
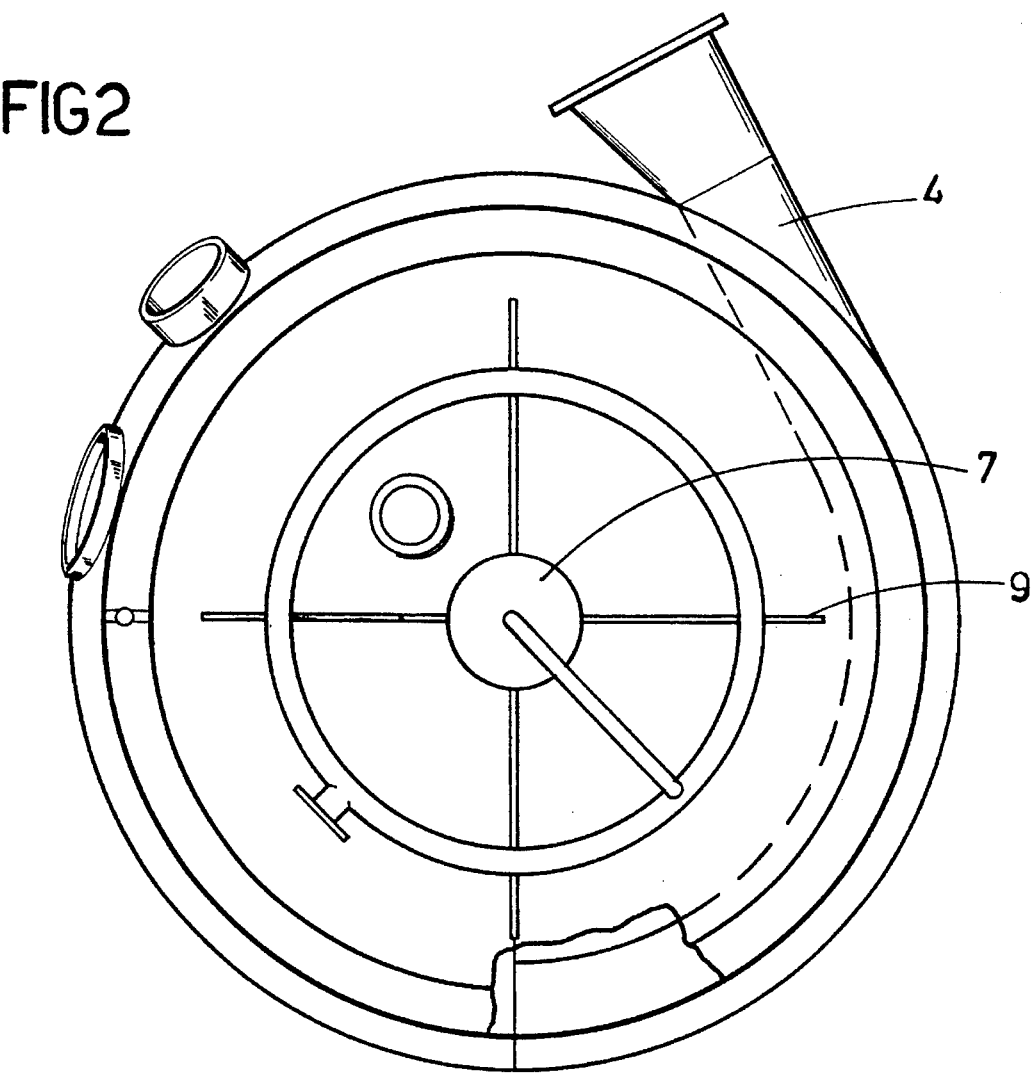
FIG. 2 shows the separator of FIG. 1 in a view from above.

FIGS. 1 and 2 of the drawings illustrate one such separator, denoted 1 its entirety.

The separator 1 comprises a vertical chamber 2 compassed by a wall 3 composed of a top section 3*a* that converges gently upwards at a predetermined taper, and extending down from the top section 3*a*, in sequence, a first frustoconical section 3*b*, a cylindrical section 3*c*, and a further frustoconical section 3*d*.

4 denotes a tangential inlet associated with the top section 3*a*, through which the product to be separated is directed into the chamber 2.

The chamber 2 is provided further with a coaxially disposed bottom outlet 5 through which the heavier part or liquid phase of the separated product is discharged. The outlet 5 coincides with the lowest point of the bottom section 3*d*.

6 denotes a duct secured to the chamber wall by means of four webs 9 serving as centralizers and vortex baffles, each of which welded to the duct on one side and to the wall 3 on the opposite side.

Also indicated in FIG. 1 is a ring 11, anchored to the wall 3 by way of three welded struts 10 spaced apart at 120°, of which the internal diameter is marginally greater than the external diameter of the duct 6.

The ring 11 coaxially encircles the top end of the duct 6.

The duct 6 comprises a vertical stretch extending internally of and coaxially through the chamber 2. The topmost end of the vertical stretch occupies a position above the level of the tangential inlet 4, and affords an inlet port 7 into which vapors are gathered.

At the lower extremity of the vertical stretch, the duct 6 changes direction through 90°, as indicated in FIG. 1 by an elbow 8 connecting with a horizontal stretch.

6*a* denotes a terminal portion of the horizontal stretch of duct, which extends externally of the chamber.

This same terminal portion 6*a* is connected to the inlet of the heat exchanger in a further stage, or of a condenser, neither of which are illustrated. In operation, the function of the separator is to separate a mixture (liquid phase and vapor phase), directed into the chamber by way of the tangential inlet 4.

The heavier part or liquid phase of the mixture passes through the bottom outlet 5.

Figure 3:
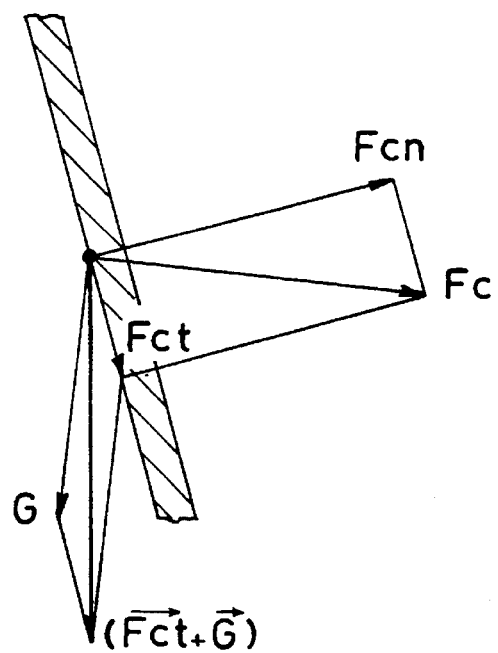
FIG. 3 is a diagrammatic illustration of the forces which act on a particle of liquid internally of the separator.

Referring to FIG. 3, the separation of the heavier part or liquid phase is improved by the angle of the chamber wall in the top section 3a, since the centrifugal force Fc divides into two components of which one, denoted Fcn, is directed perpendicular to the wall and another, downwardly directed and denoted Fct, coincides with the generator of the cone determining the taper; the combined effect of this latter component Fct and the weight G of the droplets results in the liquid being driven with added impetus toward the outlet 5.

The lighter part or vapor phase of the separated mixture enters the top inlet 7 of the duct 6 and is conveyed into the heat exchanger of the next stage, or into the condenser.

Simple and economical in construction, the cyclone separator disclosed is also of relatively compact dimensions. In particular, the duct 6 exhibits only one change of direction.

The length of the duct is also suitably limited. The separator disclosed allows a more efficient removal of vapor from a given foodstuff, per single stage, than that afforded by conventional cyclone separators: thanks, not least, to the particular geometry of the tapered wall 3a and the consequent enhancement of the centrifugal force by which the liquid and vapor phases are separated.

As a result, the same effectiveness of separation can be achieved with fewer stages.

What is claimed:

1. A cyclone separator, comprising:

a a side wall and a closed upper end wall forming a chamber;

an inlet in said side wall through which a product to be separated into a liquid phase and a gaseous phase is directed into the chamber in a flow direction generally tangential to said side wall;

a bottom outlet for said chamber from which the separated heavier liquid phase part of the introduced product is discharged upon separation;

a duct mounted within said chamber having an inlet port at one end adjacent said closed end and above said sidewall inlet to admit the separated lighter gaseous phase part of the product to be separated, the other end of said duct extending externally of said side wall for communication to a further separator or with a condenser.

2. A separator as in claim 1, wherein said duct has a first portion including said duct inlet port disposed internally of said chamber and extending along at least a part of the length of said chamber, and a second portion including said duct other end substantially transverse to said first portion disposed externally of the chamber.

3. A separator as in claim 2, wherein said side wall forming said chamber has a convergent tapered upper section, said inlet for the product located in said tapered upper section to enhance the centrifugal force by which the product liquid phase is separated from the vapor phase.

4. A separator as in claim 1, wherein said side wall forming said chamber has a convergent tapered upper section, said inlet for the product located in said tapered upper section to enhance the centrifugal force by which the product liquid phase is separated from the vapor phase.

5. A separator as in claim 1, wherein said duct other end is located below said chamber inlet for the product.

* * * * *

UNITED STATES PATENT AND TRADEMARK OFFICE
CERTIFICATE OF CORRECTION

PATENT NO. : 5,585,000
DATED : December 17, 1996
INVENTOR(S) : Carlo SASSI

It is certified that error appears in the above-indentified patent and that said Letters Patent is hereby corrected as shown below:

On title page, item, [30], Foreign Application Priority Data, change "PR940011 U" to --PR94U000011--.

Signed and Sealed this

Twenty-second Day of April, 1997

Attest:

BRUCE LEHMAN

*Commissioner of Patents and Trademarks*

*Attesting Officer*